(12) United States Patent
Asselin

(10) Patent No.: US 9,315,110 B2
(45) Date of Patent: Apr. 19, 2016

(54) DEVICE FOR INDUCTIVE TRANSFER OF ELECTRICAL ENERGY AND METHOD FOR USE THEREOF

(75) Inventor: Pascal Asselin, Riedisheim (FR)

(73) Assignee: CONDUCTIX-WAMPFLER GMBH, Weil am Rhein (DE)

( * ) Notice: Subject to any disclaimer, the term of this patent is extended or adjusted under 35 U.S.C. 154(b) by 390 days.

(21) Appl. No.: 13/993,469

(22) PCT Filed: Nov. 9, 2011

(86) PCT No.: PCT/EP2011/069763
§ 371 (c)(1),
(2), (4) Date: Aug. 22, 2013

(87) PCT Pub. No.: WO2012/079860
PCT Pub. Date: Jun. 21, 2012

(65) Prior Publication Data
US 2014/0292263 A1 Oct. 2, 2014

(30) Foreign Application Priority Data

Dec. 14, 2010 (DE) .......................... 10 2010 054 472

(51) Int. Cl.
*H02J 7/00* (2006.01)
*B60L 11/18* (2006.01)
(Continued)

(52) U.S. Cl.
CPC .............. *B60L 11/182* (2013.01); *B60L 3/0046* (2013.01); *B60L 3/04* (2013.01); *B60L 11/1809* (2013.01);
(Continued)

(58) Field of Classification Search
CPC ............................ H02J 5/005; B60L 11/1809

USPC ................................................... 320/108-109
See application file for complete search history.

(56) References Cited

U.S. PATENT DOCUMENTS 4,045,728 A * 8/1977 Fletcher et al. ................ 324/655
4,156,184 A * 5/1979 Benbow .................... 324/103 R
(Continued)

FOREIGN PATENT DOCUMENTS

DE 69602739 T2 10/1999
DE 10158794 A1 6/2003
(Continued)

OTHER PUBLICATIONS

International Preliminary Report published Jun. 18, 2013 for PCT/EP2011/069763 filed on Nov. 9, 2011.
(Continued)

*Primary Examiner* — Paul Dinh
(74) *Attorney, Agent, or Firm* — Paul D. Bianco; Katharine Davis; Fleit Gibbons Gutman Bongini & Bianco PL

(57) ABSTRACT

A device for the inductive transfer of electric energy from a stationary unit having a current supply device and a primary inductance to a vehicle that is adjacent the unit and has a secondary inductance. The vehicle has a secondary control element for adjusting the secondary power taken from the secondary inductance and comprises a control device enabling the withdrawn secondary power to be modified in steps. The stationary unit comprises a primary control element for adjusting the primary power and a first measuring device enabling an operational parameter, influenced by the secondary power, of the current supply device to be measured. The primary control element adjusts the primary power which can be injected in accordance with modifications of the operational parameter. The secondary power can be switched by the switching device and has in one of the steps, a value which is at least approximately zero.

14 Claims, 1 Drawing Sheet

(51) Int. Cl.
*H02J 7/02* (2006.01)
*H04B 5/00* (2006.01)
*B60L 3/00* (2006.01)
*B60L 3/04* (2006.01)

(52) U.S. Cl.
CPC ......... *B60L 11/1824* (2013.01); *B60L 11/1846* (2013.01); *H02J 7/025* (2013.01); *H04B 5/0037* (2013.01); *B60L 2210/30* (2013.01); *B60L 2210/40* (2013.01); *B60L 2240/547* (2013.01); *B60L 2240/549* (2013.01); *Y02T 10/7005* (2013.01); *Y02T 90/122* (2013.01); *Y02T 90/14* (2013.01)

(56) References Cited

U.S. PATENT DOCUMENTS

| | | | |
|---|---|---|---|
| 4,496,896 A | 1/1985 | Melocik et al. | |
| 4,752,666 A * | 6/1988 | Alessandri, Jr. | 219/95 |
| 5,594,318 A | 1/1997 | Nor et al. | |
| 6,912,137 B2 | 6/2005 | Berghegger | |
| 2003/0151930 A1 | 8/2003 | Berghegger | |
| 2008/0079392 A1 | 4/2008 | Baarman et al. | |
| 2010/0156346 A1 * | 6/2010 | Takada et al. | 320/108 |
| 2010/0295506 A1 | 11/2010 | Ichikawa | |
| 2011/0181240 A1 * | 7/2011 | Baarman et al. | 320/108 |
| 2011/0204845 A1 * | 8/2011 | Paparo et al. | 320/108 |
| 2011/0285210 A1 | 11/2011 | Lemmens et al. | |
| 2011/0291491 A1 | 12/2011 | Lemmens et al. | |
| 2012/0032633 A1 | 2/2012 | Cordes et al. | |
| 2012/0161696 A1 * | 6/2012 | Cook et al. | 320/108 |
| 2012/0175967 A1 | 7/2012 | Dibben et al. | |
| 2012/0295174 A1 * | 11/2012 | Imanishi et al. | 429/428 |

FOREIGN PATENT DOCUMENTS

| | | |
|---|---|---|
| WO | 2009081115 A1 | 7/2009 |
| WO | 2010099887 A2 | 9/2010 |
| WO | 2010115867 A1 | 10/2010 |

OTHER PUBLICATIONS

English Translation of Written Opinion published Jun. 14, 2013 for PCT/EP2011/069763 filed on Nov. 9, 2011.
International Search Report published Oct. 9, 2012 for PCT/EP2011/069763, filed Nov. 9, 2011.
Written Opinion for PCT/EP2011/069763, filed Nov. 9, 2011.

* cited by examiner

DEVICE FOR INDUCTIVE TRANSFER OF ELECTRICAL ENERGY AND METHOD FOR USE THEREOF

FIELD OF THE INVENTION

The invention relates to a device for the inductive transfer of electrical energy.

BACKGROUND OF THE INVENTION

When charging the battery of an electric vehicle, it is necessary to adjust the charging current to an appropriate value at all times, based on the specifications of the battery and the current charge state of the battery. The electronics necessary for this can be selectively arranged on board the vehicle or in the charging station. For an inductive transfer of energy from the charging station to the vehicle, the charging station must offer the maximum possible charging power if all the charging electronics are arranged in the vehicle, and this power must then be stepped down in the vehicle to the instantaneously required value. This leads to relatively high power losses both on the primary side and on the secondary side, and requires a correspondingly robust and therefore expensive design of the secondary-side charging electronics.

To avoid this, the power offered on the primary side can be controlled on the basis of the secondary-side power requirements, but appropriate communication from the secondary side to the primary side is necessary. This communication can either be handled via a completely separate communications channel, for example a wireless connection, or a data signal can be modulated onto the transfer link provided for inductive energy transfer. Both solutions, however, require special communication hardware on the primary and secondary sides, which is connected with corresponding costs.

A traction battery charging system with inductive coupling is known from DE 696 02 739 T2, in which the charging station can be controlled from a vehicle-side battery charging control module. A data communication means, which can be a data cable, a fiber-optic conductor or a wireless transmission link, is provided for communication between this battery charging module and the charging station.

For an inductive non-contact power transfer means for small devices such as mobile telephones and electric toothbrushes, DE 101 58 794 B4 teaches the adjustment of the primary-side power on the basis of the secondary-side power requirements by means of a primary-side control unit, which controls the power transfer by varying the duty ratio in the case of a low secondary-side power requirement, and by varying the frequency of a primary-side voltage-controlled oscillator in the case of a high secondary-side power requirement.

SUMMARY OF THE INVENTION

The invention is based on the problem of specifying a simple and cost-effective solution for controlling the charging process for inductive charging of an electric vehicle at a charging station.

This problem is solved according to the invention by a device described and exemplified herein. Advantageous configurations of the invention are also described and exemplified herein.

In a device of the present class according to the invention for inductive transfer of electrical energy, the vehicle comprises a secondary control element for adjusting the secondary power withdrawn from the secondary inductance, said control element containing a switching device by means of which the withdrawn secondary power can be varied stepwise. For adjusting the primary power that can be injected into the primary inductance, the stationary unit has a primary control element that contains a first measurement device by means of which an electrical operating parameter influenced by the secondary power can be measured, and the primary control element adjusts the injectable primary power on the basis of changes of the operating parameter measured by the first measuring device. Primary and secondary power in this case always refer to the effective power, and the attribute "injectable" means that the primary power is not applied but rather offered, and the actual power flowing into the primary coil also depends on the power which is withdrawn from the secondary coil.

This opens the possibility of controlling the supplying of primary power from the secondary side without having to set up a separate communication channel with the corresponding hardware. Only a switching device for stepwise adjustment of the secondary power, preferably for switching it on and off, is required on the secondary side. Such a switching device must be provided in any case in order to be able to terminate the energy transfer when required, in particular during charging of a vehicle battery when it is fully charged or when a fault of some type occurs. Therefore, no additional expense for hardware on the secondary side is incurred by the solution according to the invention. The same applies accordingly on the primary side as well, because the energy transfer there must in any case be monitored by measurement, and a device for adjusting the injectable primary power is generally present in any case. In order to transmit the information about the secondary side power requirement, the existing inductive transfer link is used, in particular without frequency multiplexing, i.e. without the necessity for modulation and demodulation.

The preferred application of the invention is the charging of a vehicle battery. The measurement of the charging current is provided on the secondary side, and if there is a deviation of the measured value of the charging current from its target value, the switching device carries out a temporal sequence of switching processes dependent on the ratio between the target value and the measured value. The injectable primary power is then adjusted depending on this switching pattern, which affects the primary side and can be detected there on the basis of an electrical operating parameter.

If the target value of the charging current is exceeded by the measured value, a preferred variant of the invention provides a periodic switching of the secondary power between two steps in a predetermined time cycle, the duty ratio of this switching corresponding to the ratio between the target value and the measured value of the charging current. Thereby the primary control element directly receives information on the required extent for reducing the primary power and can adjust it accordingly. If one of the two steps of secondary power corresponds to a shutoff, then the mean value of the received secondary power is already reduced to the necessary extent in advance, before the primary control element responds and reduces the primary power correspondingly.

If the target value of the charging current is exceeded by the measured value, another preferred variant of the invention provides a changeover to a lower of two steps, preferably a shutoff, which lasts until an electrical parameter of the secondary side that in the lower step is dependent on the primary power reaches a value at which a changeover to the higher step leads to a coincidence of the charging current with its target value. In this case, the primary control element reduces the value of the primary power at a predetermined rate over time until the primary side detects that there has been a switch back to the higher step on the secondary side. In this manner as well, the consumption of an excessively large secondary power is suppressed even before the primary control element responds. It can take a bit longer in this case until the correct value of the primary power is achieved because, due to the secondary-side switching, the primary control element does not receive any information about the extent of the secondary-side deviation between the actual value and the target value of the target parameter, i.e. the charging current.

The invention is not limited to power regulation in one direction, i.e. a reduction of the primary power, but also includes increasing the primary power if needed by also being able to code the direction of the deviation between the actual value and the target value of a secondary-side target parameter in the temporal pattern of the switching processes taking place on the secondary side that is detected on the primary side. When a corresponding code is received, the primary power can also be increased by a predetermined step or at a predetermined rate over time.

BRIEF DESCRIPTION OF THE DRAWINGS

The description below of an embodiment with reference to the drawings discloses further details and advantages of the invention. Therein.

DETAILED DESCRIPTION OF THE INVENTION

Figure 1:
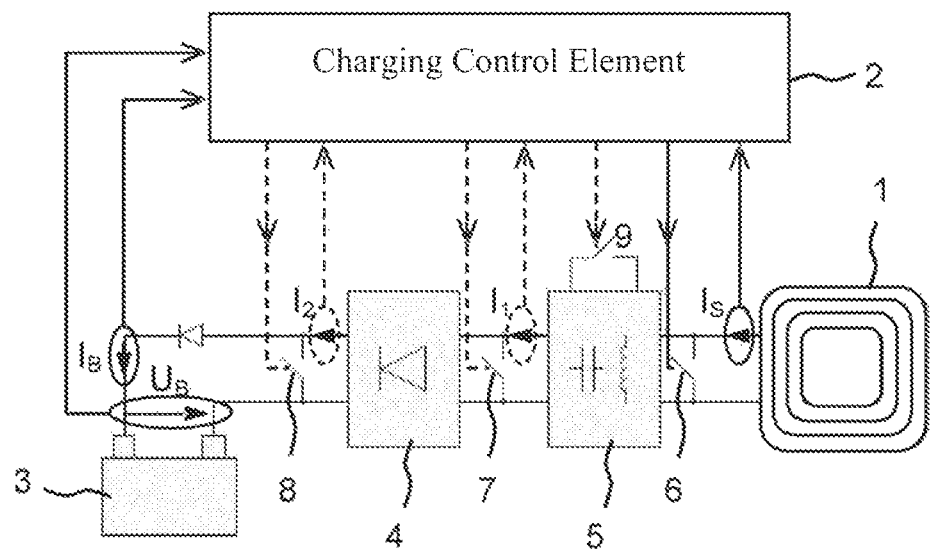
FIG. 1 shows a block schematic diagram of the secondary side of a device according to the invention and FIG. 2 shows a block schematic diagram of the primary side of a device according to the invention.

As the block schematic diagram of FIG. 1 shows, the secondary side of a device for inductive energy transfer according to the invention arranged on board an electrically driven vehicle, not shown, comprises a secondary coil 1, a charging control element 2 has a secondary control element and a battery 3, among other things. During operation of the device, the battery 3 is charged with a direct current $I_B$ which is converted by a converter 4 from an alternating current $I_S$ induced in the secondary coil 1. The converter 4 contains a rectifier and can also contain a voltage converter if the output voltage of the rectifier requires reduction for charging the battery 3. Because the entire arrangement, together with the primary side to be described later with reference to FIG. 1, is operated resonantly, a balancing network 5 is connected between the secondary coil 1 and the converter 4. The connection of this balancing network 5 ensures the satisfaction of the resonance condition at the desired operating frequency.

The charging control element 2 contains a measurement device by means of which it can measure the battery voltage $U_B$ of the battery 3 and the charging current $I_B$. The instantaneous charge state of the battery 3 can be determined from these parameters. This yields a target value $I_0$ for the charging current $I_B$, said target value changing over time, in particular decreasing. In addition, the charging control element 2 is also designed to measure the secondary current $I_S$ flowing in the secondary coil 1. A switch 6, by means of which the secondary coil 1 can be short-circuited, and which is controlled by the charging control element 2, is provided in parallel with the secondary coil 1 in order to influence the charging current $I_B$ by means of the charging control element 2.

A measurement of the output current $I_1$ or $I_2$ of the balancing network 5 or the converter 4, respectively, could also be provided as an alternative to measuring the secondary current $I_S$. A switch 7 or 8 for short-circuiting the input or the output, respectively, of the converter 4 could be provided as an alternative to the switch 6. Measuring the output current $I_2$ of the converter 4 only makes sense with a switch 8 at the output of the converter 4, because otherwise the current $I_2$ is always identical to the charging current $I_B$. A switch 9 for short-circuiting or disconnecting a circuit branch inside the balancing network 5 could also be provided as an alternative to the switch 6. It is obvious that the charging current $I_B$ can be influenced, i.e. effectively shut off, by each of switches 6-9. The effect of the switch 9 is based on the fact that the functioning of the balancing network 5 is nullified when said switch is activated and the system normally operated resonantly goes out of resonance, which leads to a significant decline of the charging current $I_B$.

As follows from the block circuit diagram of FIG. 2, the primary side of a device according to the invention comprises a primary coil 10, which is fed a primary current $I_P$ by a current supply device 11, and a primary control element 12. The latter contains a measurement device by means of which it can measure the primary current $I_P$. The current supply device 11 comprises a rectifier 13, the input of which is connected to a current supply network, a DC link 14 connected to the output of the rectifier 13, which generates a DC voltage of a predetermined magnitude from the output voltage of the rectifier, and an inverter 15, which generates an AC voltage of predetermined frequency and amplitude, which is fed to the primary coil 10, from the DC voltage of the DC link 14, with which it is supplied.

Because the entire arrangement, together with the primary side explained with reference to FIG. 1, is to be operated in resonance, a balancing network 16 is connected between the inverter 15 and the primary coil 10. The connection of this balancing network 16 ensures the satisfaction of the resonance condition at the desired operating frequency. As an alternative to the measurement of the primary current $I_P$ on the primary side, a measurement of the output current $I_3$ or the input current $I_4$ or the input voltage $U_4$ of the inverter 15 or the input current $I_N$ of the rectifier 13 from the current supply network could be provided, as indicated in dashes in FIG. 2, analogously to FIG. 1.

The invention enables a control of the power injectable on the primary side, i.e. the primary power that can be fed to the primary coil 10 in case of the maximum secondary-side power consumption, on the basis of the secondary-side power requirement, which follows from the target value of the charging current $I_B$, without providing a separate communication channel between the secondary side and the primary side. It is understood that the actual power flowing in the primary coil 10 always depends on the connection of the secondary coil 1. Whenever an adjustment of the primary power is mentioned in the present context, the maximum available power is always meant. The operation of the device according to the invention will be described below.

After the device is put into operation, which takes place by an initiation signal, not of interest here, after parking a vehicle at a charging station with a suitable alignment of the secondary coil 1 relative to the primary coil 10, the primary control element 12 adjusts the inverter 15 to maximum power, which can depend on the rated power data of the secondary side, which must be known in this case by the primary control element 12. This yields a corresponding maximum value of the primary current $I_P$ and corresponding maximum values of the secondary current $I_S$ and the charging current $I_B$ for the battery 3.

If the value of the charging current $I_B$ for the current charging state of the battery 3 is too large, then the charging control element 2 short-circuits the secondary coil 1 by closing the switch 6, whereby the secondary side no longer consumes any power apart from losses in the secondary coil 1 itself. This secondary-side short circuit has an effect on the primary side and causes an abrupt change of the primary power consumed by the primary coil 10 from the current supply device 11. This change is detected by the primary control element 12 on the basis of the primary current $I_P$ and the primary voltage $U_P$ and signals a secondary-side need for a reduction of the available primary power.

According to a first embodiment of the invention, a computing device contained in the charging control element 2 determines the necessary amount of reduction of the charging current $I_B$, which is defined by the ratio $I_0/I_B$, from the measured value of the charging voltage $I_B$ and its present target value $I_0$. The charging control element closes and opens the short-circuit switch 6 periodically with a duty ratio of the opening time $T_0$ to the entire period duration $T_P$ that corresponds to the ratio $I_0/I_B$. The time profile of the primary power measured by the primary control element 12, which likewise alternates periodically between two values as a result of the actuation of the switch 6, has the same duty ratio $T_0/T_P$.

From the duty ratio $T_0/T_P$, the computing device contained in the primary control element 12 calculates the change of amplitude for the primary current $I_P$ that is necessary for adjusting the charging current $I_B$ to its target value $I_0$ and undertakes a corresponding change in the adjustment of the inverter 15 via a control line. For this purpose, the inverter 15 contains an H-bridge, for example. Its switching angle is changed to a value that results in a primary current $I_P$ with the required value. In the simplest case, the amplitude of the primary current $I_P$ can be reduced by a factor that is calculated by multiplying the ratio $T_0/T_P$ by a correction factor. A more complex relationship can also be present, however, and can be taken into account computationally.

In the matter described above, the primary-side power can only be reduced, which is also the normal case when charging a battery, because the required charging current $I_B$ decreases with increasing charging of the battery 3. It can also occur, however, that the charging current $I_B$ must be increased in the course of the charging process, for example, if the weight of the vehicle is reduced during the charging process by exiting of persons or unloading of objects from the trunk or cargo space. Due to the rebounding of the chassis, there is then an enlargement of the space between the secondary coil 1 mounted on the underside of the vehicle and the primary coil 10 mounted on the ground at the charging station, which causes a reduction of the inductively transmitted power.

In order to signal a need by the secondary side for an increase of the available primary power, the charging control element 2 carries out one or more switching processes with the short-circuit switch 6, the temporal progression of which deviates significantly from the pattern defined for signaling a reduction requirement. For example, closure of the switch for a time interval significantly exceeding the period duration $T_P$ or periodically opening and closing the switch with a period duration deviating from the period duration $T_P$ and substantially shorter, and a corresponding duty ratio can be provided. Such a signal pattern is interpreted by the primary control element as a request for increasing power and leads to a corresponding activation of the inverter 15.

The extent of the necessary increase of primary power can likewise be signaled by the charging control element 2 by the duty ratio of a periodic operation of the switch 6, analogously to the extent of a necessary decrease, or the primary power can be increased without knowledge of the necessary extent by a step of predetermined height or continuously at a predetermined rate over time. If an increase by one step is not sufficient, then the charging control element 2 can request further increases in the same manner, until the charging current $I_B$ reaches or exceeds the target value $I_0$. If it is exceeded, a reduction or an end of the continuous increase can be requested in the manner previously described. In any case, it makes good sense if the charging control element 2 only requests a change of primary power when the deviation of the charging current $I_B$ from its target value $I_0$ exceeds a tolerance threshold, in order to avoid continuous pulsing around the target value $I_0$.

A second, simpler embodiment of the invention forgoes signaling the necessary amount of the power reduction to the primary side by periodic sampling of the secondary power; instead, the secondary-side short circuit switch 6 is closed by the charging control element 2 if the target value $I_0$ of the charging current $I_B$ is exceeded, and the primary control element 12 determines this on the basis of the primary power and then reduces the available primary power, i.e. the value of the primary current $I_P$, stepwise or continuously at a predetermined rate over time.

Because the charging current $I_B$ goes to zero after closure of the short-circuit switch 6, it is no longer available as a measurement parameter, so that a different criterion for achieving the correct operating point of the system is required on the secondary side. In this case, the secondary current $I_S$, which is different from zero even after short-circuiting of the secondary coil 1 by the switch 6, is used as the criterion. For this purpose, however, the relationship between the secondary current $I_S$ in the case of a short circuit and the charging current $I_B$ with an open switch 6 must be known. This relationship can be determined in advance experimentally and stored in a memory of the charging control element 2. The relationship between $I_S$ and $I_B$ can be described approximately by a constant factor, but there could be a nonlinear characteristic curve, which can be stored as a formula or table.

The relationship between $I_S$ and $I_B$ can also be determined approximately during operation and stored, if the primary control element 12 increases the primary current $I_P$ at the beginning of the charging process at a predetermined rate over time. In this case, the switch 6 is open, however, so that the current $I_S$ measured then is not the short circuit current of the secondary coil 1, and the change of the secondary current $I_S$ due to the opening of the switch 6, i.e. the difference between normal operation and a short circuit of the secondary coil 2, is then not taken into account.

In the simplest case, a proportionality factor can be determined from the ratio between the secondary current $I_S$ immediately after the closure of the switch 6, i.e. even before a response of the primary control element 12, and the charging current $I_B$ immediately before closure of the switch 6, and a target value of the secondary current $I_S$ during a short circuit can be calculated by multiplying the target value $I_0$ of the charging current by this proportionality factor.

In the second embodiment, the charging control element 2 therefore measures the secondary current $I_S$ after closure of the switch 6, while the primary control element 12 reduces the power offered on the primary side, i.e. the primary current $I_P$, at a constant rate and compares the measured secondary current $I_S$ to a target value $I_{S0}$, which it has determined from the present target value $I_0$ of the charging current $I_B$ and the stored relationship between $I_S$ and $I_B$.

When the secondary current $I_S$ has reached its target value $I_{S0}$, the charging control element 2 again opens the switch 6. This switching process has an effect on the primary side and is detected by the measuring device of the primary control element 12 on the basis of the primary power, whereupon the primary control element 12 ends the reduction of the primary current $I_P$ at the currently achieved value.

The need for an increase of the primary power can be signaled in the second embodiment by operating the switch 6 according to a predetermined pattern over time, for example one or more very short pulses. In this case, the primary current can be increased by the primary control element 12 at a predetermined rate over time and the increase of the charging current $I_B$ caused thereby can be directly detected by the measuring device of the charging control element 2. When the charging current $I_B$ has reached its target value, the charging control element 2 can signal this to the primary control element 12 by again operating the switch 6 in a predetermined pattern over time. For example, the same pattern could be used here as that for signaling an increased need for power, because the primary control element 12 is already in the operating mode for increasing power and again receiving the same signal can then be interpreted differently.

While the first embodiment has the advantage that it does not require any calibration of a relationship between the charging current $I_B$ and the secondary current $I_S$, the second embodiment has the advantage that considerably fewer switching processes with a relatively large switched power occur, which could be a source of electromagnetic interference and would make corresponding countermeasures necessary.

As shown in FIG. 1 with the switches 7 and 8, at the input and output, respectively, of the converter 4 and a switch 9 at the balancing network 5, the charging current $I_B$ and thus the secondary power need not be shut off directly at the secondary coil 1, but can alternatively also be shut off at some other point of the secondary side. Accordingly, it is not necessary in the second embodiment for the current $I_S$ carried by the secondary coil to be measured; instead, if a switch 7 or 8 at the respective output of the balancing network 5 or the converter 4 is used, the respective current $I_1$ or $I_2$ measured there can be used, as indicated in FIG. 1 in broken lines. In this case there would have to be a previous calibration of the relationship between the current $I_1$ or $I_2$ measured at switch 7 or 8, respectively, and the charging current $I_B$ with an open switch 7 or 8. If the charging current $I_B$ is shut off by means of the switch 9 at the balancing network 5, the secondary current $I_S$ must be measured, just as when the switch 6 is used.

Figure 2:
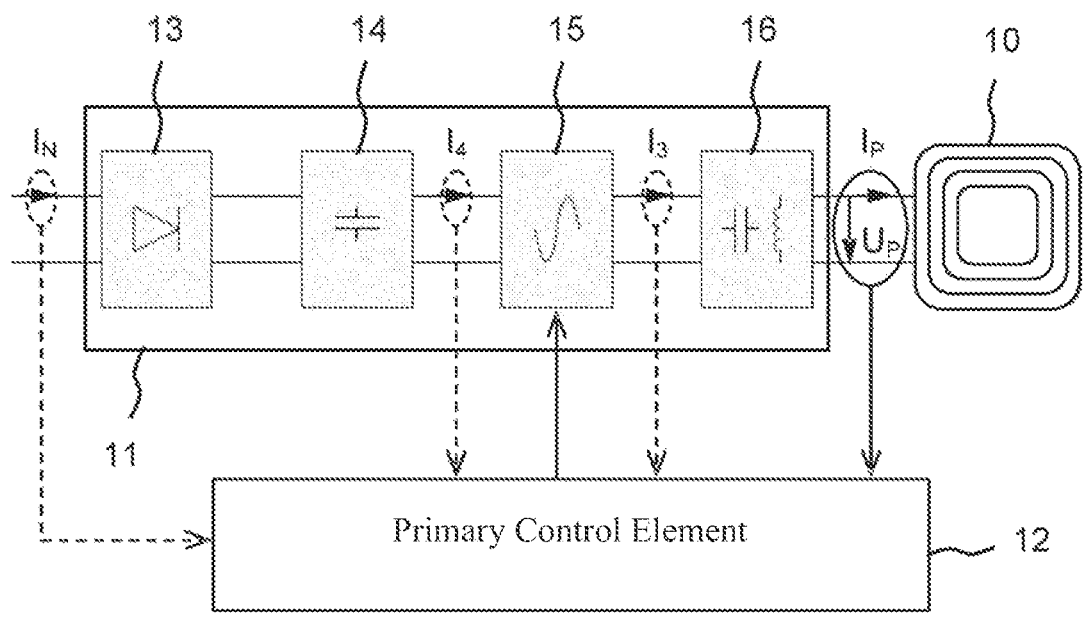

As shown in FIG. 2, a power shutoff produced by one of the switches 6-9 need not necessarily be detected on the primary side based on the current flowing directly in the primary coil 10, but instead this can be alternatively done based on a different primary-side electrical parameter such as, in particular, the output current $I_3$ or the input current $I_4$ of the inverter 15, or the input current $I_N$ drawn by the current supply device 11 from the current supply network, as indicated by broken lines in FIG. 2. All of these parameters are influenced by a secondary-side power shutoff and thus can be considered as measurement parameters for detecting such a power shutoff.

A person skilled in the art can devise possible variations for realizing the invention from the foregoing description of embodiments. Thus it does not matter whether the charging current $I_B$ is completely shut off on the secondary side; it need only be guaranteed that its change due to a secondary-side switching process is sufficiently pronounced that it can be easily determined based on a primary-side operating parameter. Additionally, the secondary-side switching could in principle also take place between more than two steps, even though switching between only two steps can be realized particularly easily and is therefore preferred. As far as the primary-side adjustment is concerned, the switching frequency and thus the frequency of the primary current $I_P$ could be varied in place of the switching angle of the inverter 15, because these factors also change the transmitted power as a result of the design of the transmission system for resonance operation. Such modifications and comparable ones are within the discretion of a person skilled in the art and are included under the protection of the claims.

The invention claimed is:

1. A device for inductive transmission of electrical energy from a stationary unit having a current supply and a primary inductance to a vehicle adjacent the stationary unit having a secondary inductance and a battery for charging with a charging current from the secondary inductance, the device comprising:
   a primary control element included with the stationary unit for controlling power supplied to the primary inductance;
   a first measuring device included with the primary control element for measuring an operating electrical parameter of the current supply, the operating electrical parameter determined by power withdrawn from the secondary inductance;
   a secondary control element included within the vehicle for controlling power withdrawn from the secondary inductance, the secondary control element having:
      a switching device for varying amounts of power withdrawn from the secondary inductance;
      a second measuring device for measuring the charging current; and
      a computing device for determining if the charging current ($I_B$) measured by the second measuring device deviates from a predetermined target value, wherein if a measured value of the charging current ($I_B$) deviates from the predetermined target value, the computing device determines a temporal sequence of switching processes for execution by the switching device, the temporal sequence of switching processes determined according to a ratio between the predetermined target value and the measured value of the charging current ($I_B$).

2. The device according to claim 1, wherein the primary control element is configured to vary power supplied to the primary inductance upon detection of the temporal sequence of switching processes.

3. The device according to claim 1, wherein the switching device is configured for switching between two positions to vary amounts of power withdrawn from the secondary inductance.

4. The device according to claim 3, wherein one of the two positions is a closed switch in which position the secondary control element withdraws no power other than losses from the secondary inductance.

5. The device according to claim 1, wherein the temporal sequence of the switching processes further includes a code for indicating whether a deviation of the measured value of the charging current ($I_B$) from the predetermined target value is positive or negative.

6. The device according to claim 5, wherein the primary control element is configured to increase power supplied to the primary inductance at a predetermined rate over time in response to a code included in the temporal sequence of the switching processes, the code indicating that the measured value of the charging current ($I_B$) has fallen below the predetermined target value of the charging current ($I_B$).

7. The device according to claim 1, wherein the primary control element is configured to change a value of power supplied to the primary inductance based on the temporal sequence of the switching processes in response to abrupt changes in the operating electrical parameter measured by the first measuring device.

8. The device according to claim 3, wherein the switching device is configured to switch between the two positions in a predetermined time cycle if the target value of the charging current ($I_B$) is exceeded by the measured value of the charging current ($I_B$) and a duty ratio of switching between positions corresponds to a ratio between the target value and the measured value of the charging current ($I_B$) and wherein the primary control element is configured to change a value of power supplied to the primary inductance based on a duty ratio of changes in the operating electrical parameter in response to abrupt changes in the operating electrical parameter measured by the first measuring device.

9. The device according to claim 3, wherein the switching device is configured to switch between the two positions, if the target value of the charging current ($I_B$) is exceeded by a value of a charging current measure by the second measuring device, the power from the secondary inductance is switched from a higher to a lower position until an operating electrical parameter of the secondary inductance or of a circuit connecting the secondary inductance to the battery, dependent in the lower position on power from the primary inductance and measurable by the second measuring device, reaches a value at which a switch to the higher position leads to a congruence of the charging current with its target value ($I_B$), and wherein if there is an abrupt change of the operating electrical parameter measured by the first measuring device, the primary control element is configured to reduce power at a predetermined rate over time until there is a further abrupt change of the operating electrical parameter measured by the first measuring device.

10. The device according to claim 9, wherein the charging current measured by the second measuring device is selected from the group consisting of a current conducted by the secondary inductance, an output current ($I_1$) of a tuning network connected downstream of the secondary inductance, and the output current ($I_2$) of a converter upstream of the battery.

11. The device according to claim 1, wherein the operating electrical parameter of the current supply measured by the first measuring device is selected from the group consisting of a voltage ($U_P$) present at the primary inductance, an output current ($I_3$) of an inverter of the current supply, an input current ($I_4$) of an inverter of the current supply, and an input current ($I_N$) of a rectifier of the current supply.

12. The device according to claim 1, wherein the switching device is a two-pole switch connected in parallel to the secondary inductance, to an output of a tuning network connected downstream of the secondary inductance, or to an output ($I_2$) of a converter connected upstream of the battery.

13. The device according to claim 1, wherein the switching device is a two-pole switch connected in parallel or in series to at least one element of a tuning network connected downstream of the secondary inductance in which function of the balancing network is dependent on a position of the switch.

14. A method for charging a battery of a vehicle by inductive transmission of electrical energy from a stationary unit having a primary inductance to a secondary inductance of the vehicle without requiring a separate communication channel between the primary inductance and the secondary inductance, the method comprising:
providing a device according to claim 1;
placing the vehicle adjacent to the stationary unit, thereby beginning inductive transmission of electrical energy to the vehicle;
measuring the operating electrical parameter of the current supply;
monitoring the inductive transmission of electrical energy for changes in the operating electrical parameter of the current supply;
varying amounts of power withdrawn from the secondary inductance according to changes in the operating electrical parameter of the current supply;
measuring the charging current;
determining if the charging current ($I_B$) measured deviates from a predetermined target value;
determining a temporal sequence of switching processes according to a ratio between the predetermined target value and the measured value of the charging current ($I_B$);
executing the temporal sequence of switching processes; and
switching a switch of the switching device into a closed position, thereby stopping inductive transmission of electrical energy to the battery of the vehicle.

* * * * *